(12) United States Patent
Xia et al.

(10) Patent No.: US 7,860,166 B2
(45) Date of Patent: Dec. 28, 2010

(54) METHOD AND APPARATUS FOR MOTION ESTIMATION IN VIDEO SIGNAL DECODING

(75) Inventors: Yu Xia, Beijing (CN); Qing Yu, Beijing (CN); Feng Bai, Beijing (CN); Hao Wang, Beijing (CN)

(73) Assignees: Vimicro Corporation, Beijing (CN); Wuxi Vimicro Corporation, Jiangju (CN)

( * ) Notice: Subject to any disclaimer, the term of this patent is extended or adjusted under 35 U.S.C. 154(b) by 1332 days.

(21) Appl. No.: 11/368,817

(22) Filed: Mar. 6, 2006

(65) Prior Publication Data

US 2006/0204046 A1    Sep. 14, 2006

(30) Foreign Application Priority Data

Mar. 10, 2005   (CN) .................. 2005 1 0053741

(51) Int. Cl.
*H04N 7/12* (2006.01)
(52) U.S. Cl. ................ 375/240.16; 375/240.2; 375/240.15; 375/240.22; 375/240.24; 711/114
(58) Field of Classification Search ............ 375/240.15, 375/240.16, 240.12, 240.21
See application file for complete search history.

(56) References Cited

U.S. PATENT DOCUMENTS

| | | | | |
|---|---|---|---|---|
| 6,728,317 B1* | 4/2004 | Demos | .................. | 375/240.21 |
| 7,050,502 B2* | 5/2006 | Yasunari et al. | ........ | 375/240.16 |
| 7,606,310 B1* | 10/2009 | Ameres et al. | ......... | 375/240.16 |
| 7,715,479 B2* | 5/2010 | Lu et al. | ................ | 375/240.16 |
| 2005/0169374 A1* | 8/2005 | Marpe et al. | ........... | 375/240.16 |
| 2006/0093231 A1* | 5/2006 | Otsuka | ....................... | 382/239 |
| 2008/0052460 A1* | 2/2008 | Drori et al. | .................. | 711/114 |
| 2009/0168872 A1* | 7/2009 | Jeon et al. | .............. | 375/240.12 |

* cited by examiner

*Primary Examiner*—Shuwang Liu
*Assistant Examiner*—Hirdepal Singh
(74) *Attorney, Agent, or Firm*—Wuxi Sino IP Agency, Ltd.; Joe Zheng

(57) ABSTRACT

Efficient search window storage schemes for motion estimation in video signal processing are disclosed. According to one embodiment, motion estimation is carried out as follows: allocating a ring buffer to store at least critical number of macro-blocks of luminance data from a reference frame on the motion estimator, establishing a rule to relate each storage unit of the ring buffer with each of the macro-blocks of the reference frame, initializing the ring buffer by reading in one less than the critical number of macro-blocks from the reference frame, when the macro-block is located next to a border of the reference frame, generating one or more added border macro-blocks and storing into the corresponding position of the ring buffer in accordance with the rule, constructing the search window from the macro-blocks stored in the ring buffer, and conducting motion estimation of the current macro-block of the current frame with the search window.

18 Claims, 8 Drawing Sheets

METHOD AND APPARATUS FOR MOTION ESTIMATION IN VIDEO SIGNAL DECODING

BACKGROUND OF THE INVENTION

1. Field of the Invention

The present invention generally relates to the area of video signal encoding/decoding, more particularly to techniques for motion estimation in video signal processing.

2. Description of the Related Art

One of the key elements in video signal encoding is motion estimation. A video sequence includes a series of frames. To achieve compression, the temporal redundancy between adjacent frames can be exploited. For example, a frame is selected as a reference frame, and subsequent frames are predicted from the reference frame using a technique known as motion estimation. The frame undergoing motion estimation is called a current frame or an estimated frame. The processing of video signal encoding using motion estimation is also known as interframe compression. When using motion estimation, an assumption is made that the objects in the scene have only translational motion. This assumption holds as long as there are no sudden camera panning, zooming, changes in luminance, or rotational motion. Using motion estimation in interframe compression can reduce redundant frames in an encoded (i.e., compressed) video stream. As a result, a higher compression ratio can be achieved. There are a number of video signal encoding techniques and standards that use motion estimation to predict the current frame (e.g., MPEG-1, MPEG-2, MPEG-4, H.261, H.263 and H.264).

In general, about 40-70% of the total computation of a video signal encoding process is spent in motion estimation. Due to the limited computation capacities in an embedded processor, the motion estimation is often performed with the assistance of a hardware or a motion estimator (e.g., ASIC, FGPA, etc.). This arrangement reduces the computation requirement of the embedded processor. However, there is a problem associated with carrying out motion estimation in this arrangement. A large amount of data must be transmitted between the processor and the motion estimator. As a result, the system bus of a video signal decoder is overloaded and the performance suffers.

Therefore, there is a need for techniques for motion estimation that can reduce the data traffics in the system bus and improve overall performance of video signal encoding.

SUMMARY OF THE INVENTION

This section is for the purpose of summarizing some aspects of the present invention and to briefly introduce some preferred embodiments. Simplifications or omissions may be made to avoid obscuring the purpose of the section as well as in the title and abstract. Such simplifications or omissions are not intended to limit the scope of the present invention.

The present invention discloses techniques for motion estimation in video signal decoding. According to one aspect of the present invention, motion estimation is carried out as follows: allocating a ring buffer to store at least a critical number of macro-blocks of luminance data from a reference frame on the motion estimator; establishing a rule to relate each storage unit of the ring buffer with the macro-blocks of the reference frame; initializing the ring buffer by reading in one less than the critical number of macro-blocks from the reference frame; when the macro-block is located near a border of the reference frame, generating one or more added border macro-blocks and storing them into the corresponding position of the ring buffer in accordance with the rule; constructing the search window from the macro-blocks stored in the ring buffer; and conducting motion estimation of the current macro-block of the current frame with the search window.

According to one aspect of the present invention, only one additional macro-block is read in and stored into the ring buffer of the motion estimator after the initialization operation. Other required macro-blocks for constructing a search window have already been stored in the ring buffer. This minimizes the required data for motion estimation of each of the current macro-block. The overlapped macro-blocks for two neighboring current macro-blocks are stored in the ring buffer. The same data do not need to be transmitted redundantly. As a result, the amount of data transmission over the system network has reduced drastically thereby the performance of the video signal encoding is improved.

According to another aspect, the storage units of the ring buffer are allocated with consecutive storage address, which allows the data to be accessed with Direct Memory Access (DMA). This reduces the processor usage and again improves the efficiency of the video signal encoding.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-8. However, those skilled in the art will readily appreciate that the detailed description given herein with respect to these figures is for explanatory purposes as the invention extends beyond these limited embodiments.

Referring now to the drawings, in which like numerals refer to like parts throughout several views. The present invention may be implemented using hardware, software or a combination thereof and may be implemented in a computer system or other processing system such as video signal encoder.

Figure 1:
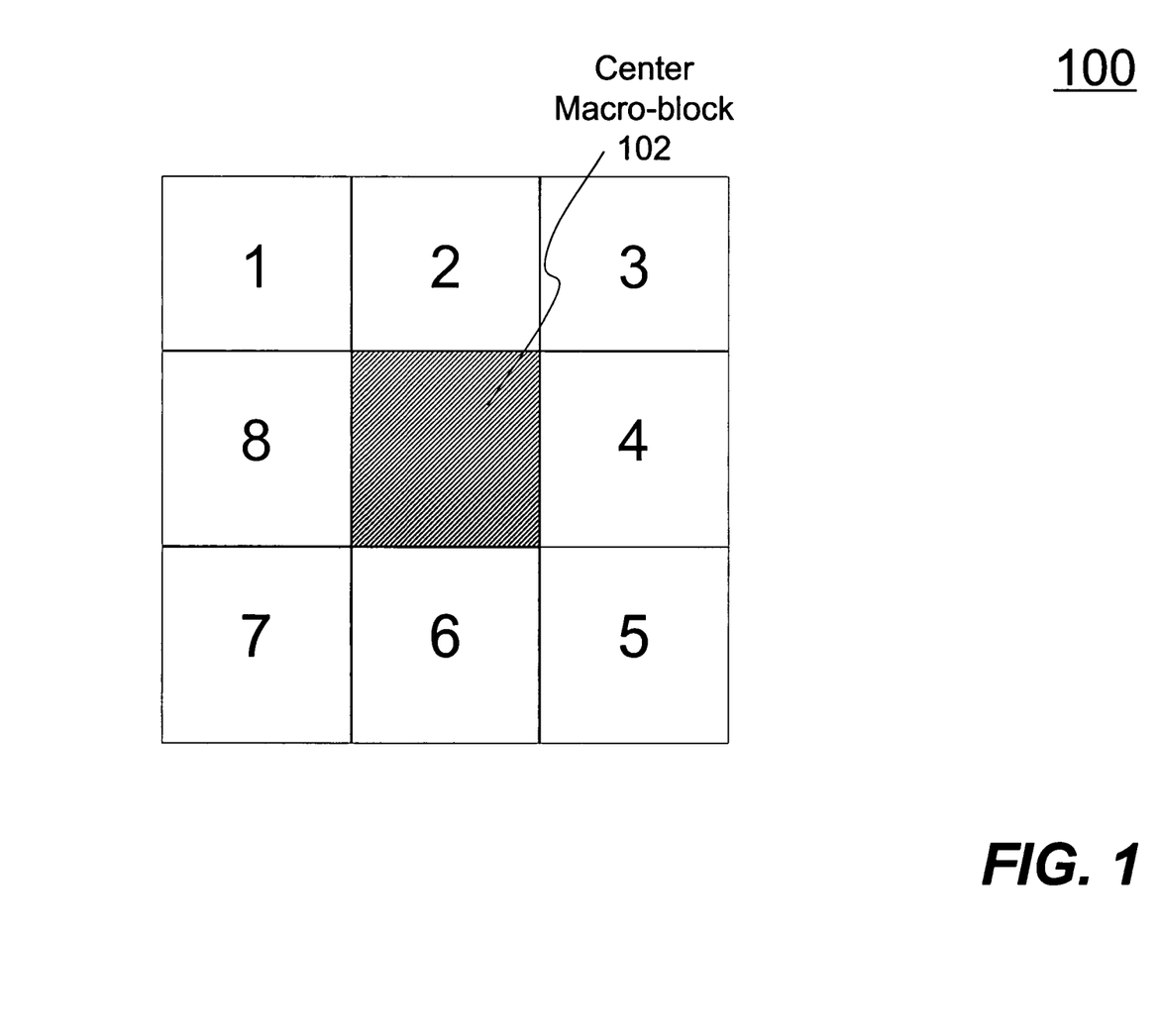
FIG. 1 depicts the structural diagram of an exemplary 3×3 search window in accordance with one embodiment of the present invention.

In a sequence of frames of a video signal encoding, a frame being created using motion estimation is called a current frame or an estimated frame. A previous frame used as basis to create the current frame is called a reference frame. Generally a frame is divided into a number of macro-blocks (MB), each of the macro-blocks includes a 16×16 pixels of luminance (i.e., brightness) component Y and a couple of 8×8 pixels of chrominance (i.e., color) components U (i.e., Cb) and V (i.e., Cr). The luminance component Y is further divided into four blocks of 8×8 pixels. Because motion estimation only uses the luminance component in a macro-block, the macro-block mentioned hereinafter is referred to as the luminance component. The motion estimation is conducted one macro-block at a time. The macro-block of the current frame undergoing motion estimation is called a current macro-block. Conducting motion estimation of the current macro-block requires following data: the data of the current macro-block and the data of a search window in the reference frame. The search window is a square area with its side equal to positive odd numbers of macro-blocks. For example, FIG. 1 shows a 3×3 search window 100, which includes nine macro-blocks with three rows and three columns. The shaded area in FIG. 1 represents the location of a macro-block of the reference frame corresponding to the current macro-block in motion estimation. The shaded macro-block is called a center macro-block 102 of the search window 100, which also includes eight surrounding macro-blocks that are labeled with numbers 1, 2, 3, 4, 5, 6, 7, and 8.

Figure 2:
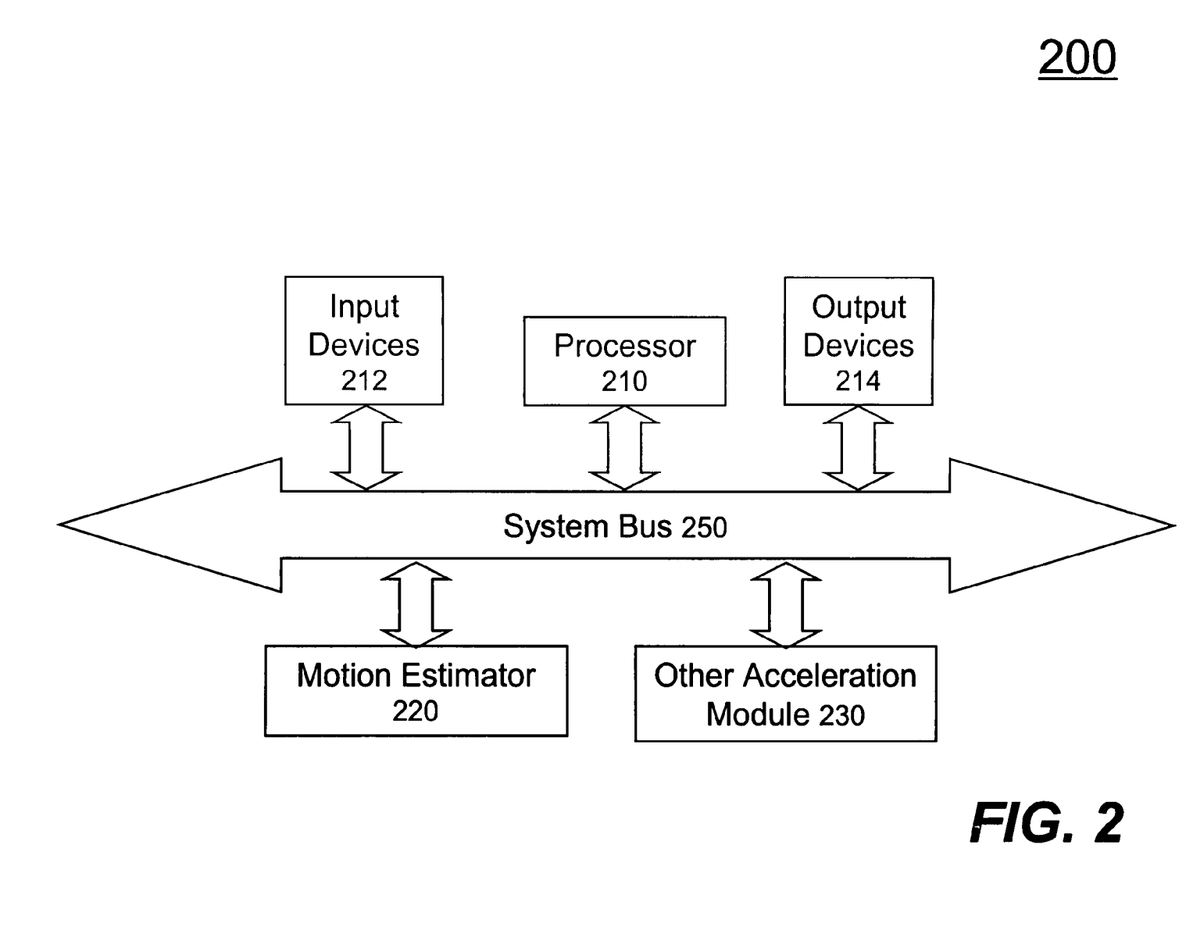
FIG. 2 shows a functional block diagram of a video signal encoder in accordance with one embodiment of the present invention.

FIG. 2 shows a structural block diagram 200 of an exemplary video signal encoder in accordance with one embodiment of the present invention. The encoder includes a processor 210, input devices 212, output devices 214, a motion estimator 220 and other hardware acceleration modules 230. The processor 210 controls the overall operation of the encoder. The input devices 212 include the devices such as an image sensor and the output devices 214 include devices such as a screen display. The motion estimator 220 is used to perform motion estimation of all of the macro-blocks in a current frame. Other hardware acceleration modules 230 (e.g., ASIC, FPGA, etc.) are used for other functions in the encoder. A system bus 250 is used to connect and transmit data between various devices, modules and the processor 210. In conducting motion estimation, the processor 210 transmits the data of the current macro-block and of the corresponding search window of the reference frame to the motion estimator 220 via the system bus 250.

Figure 3:
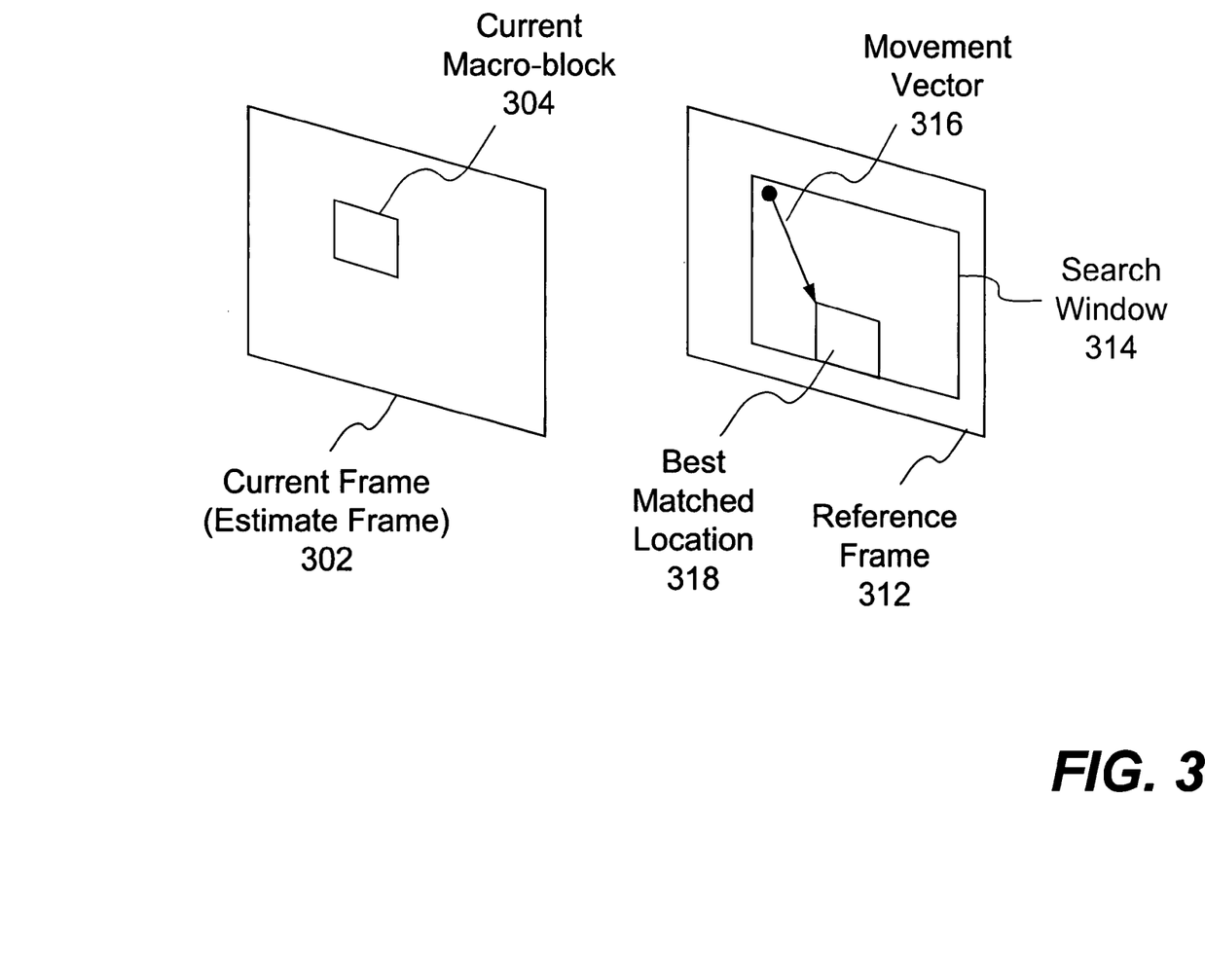
FIG. 3 shows the relationship between a current macro-block in a current frame and the corresponding search window in a reference frame in accordance with one embodiment of the present invention.

Referring now to FIG. 3, the relationship between a current macro-block in a current frame and the corresponding search window in a reference frame in accordance with one embodiment of the present invention is shown. In this embodiment, a motion estimator 220 searches and finds a data block in a search window 314 (e.g., 100 of FIG. 1) of the reference frame 312 with the same size and the closest image data of current macro-block 304 of a current frame 302. The most matched data block is called a matched block and the position of the matched block is designated as the best matched location 318. A motion vector 316 is calculated from the positional difference between the current macro-block and the matched block. The pixel difference between the current macro-block and the matched block is designated as the residual. The motion vector 318 and the residual are the output of the motion estimation.

Each of the frames consists of S×T macro-blocks with T rows and S columns. The motion estimation is conducted for each of the macro-blocks in a row-wise order. First, the processor 210 reads in the data of the current macro-block from the current frame 302 and reads in the data of the corresponding search window 314 of the reference frame 312. The search window 314 includes a center macro-block 102 and surrounding macro-blocks. The next operation depends on whether the center macro-block is located on the border of the reference frame 312.

Figure 4:
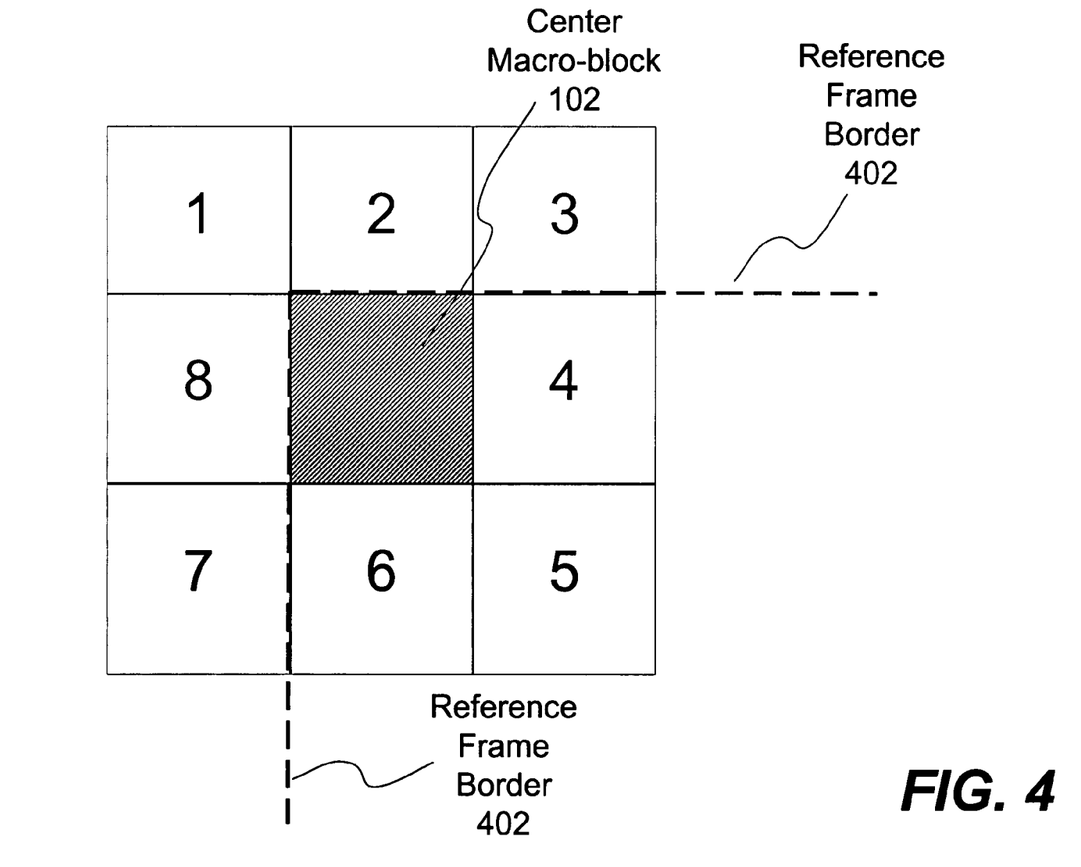
FIG. 4 shows an exemplary added border macro-block for a search window in accordance with one embodiment of the present invention.

FIG. 4 shows an exemplary added border macro-block for a search window in accordance with one embodiment of the present invention. When the center macro-block 102 is located on the border 402, the search window 314 can not be constructed with the existing macro-blocks in the reference frame 312. An added border operation is required to construct an added border reference frame (e.g., 500 of FIG. 5). For an m×m size search window, the added border requires (m−1)/2 layers of macro-blocks in each of the two translational (i.e., vertical and horizontal) directions. Illustrated in FIG. 4 is a 3×3 search window 314 (e.g., 100 of FIG. 1) used as an example to explain the added border operation. The border 402 of the reference frame 312 is shown as two thicker dotted lines in FIG. 4. The 3×3 search window 314 includes a center macro-block 102 (i.e., the shaded area) and surrounding eight macro-blocks (i.e., macro-blocks 1-8 of FIG. 1). When the center macro-block 102 of the search window 314 is located at the upper left corner of the reference frame 312, it is evident that only the center macro-block 102 and macro-blocks 4, 5 and 6 can be found in the reference frame 312. Macro-blocks 1, 2, 3, 7 and 8 are not part of the reference frame 312, so they can not be retrieved. As a result, the search window 314 can not be constructed until an added border operation has created those missing macro-blocks. There are a number of ways to create added border macro-blocks. Duplicating the pixels and creating a mirror image of the macro-blocks on the border are two of the examples.

Figure 5:
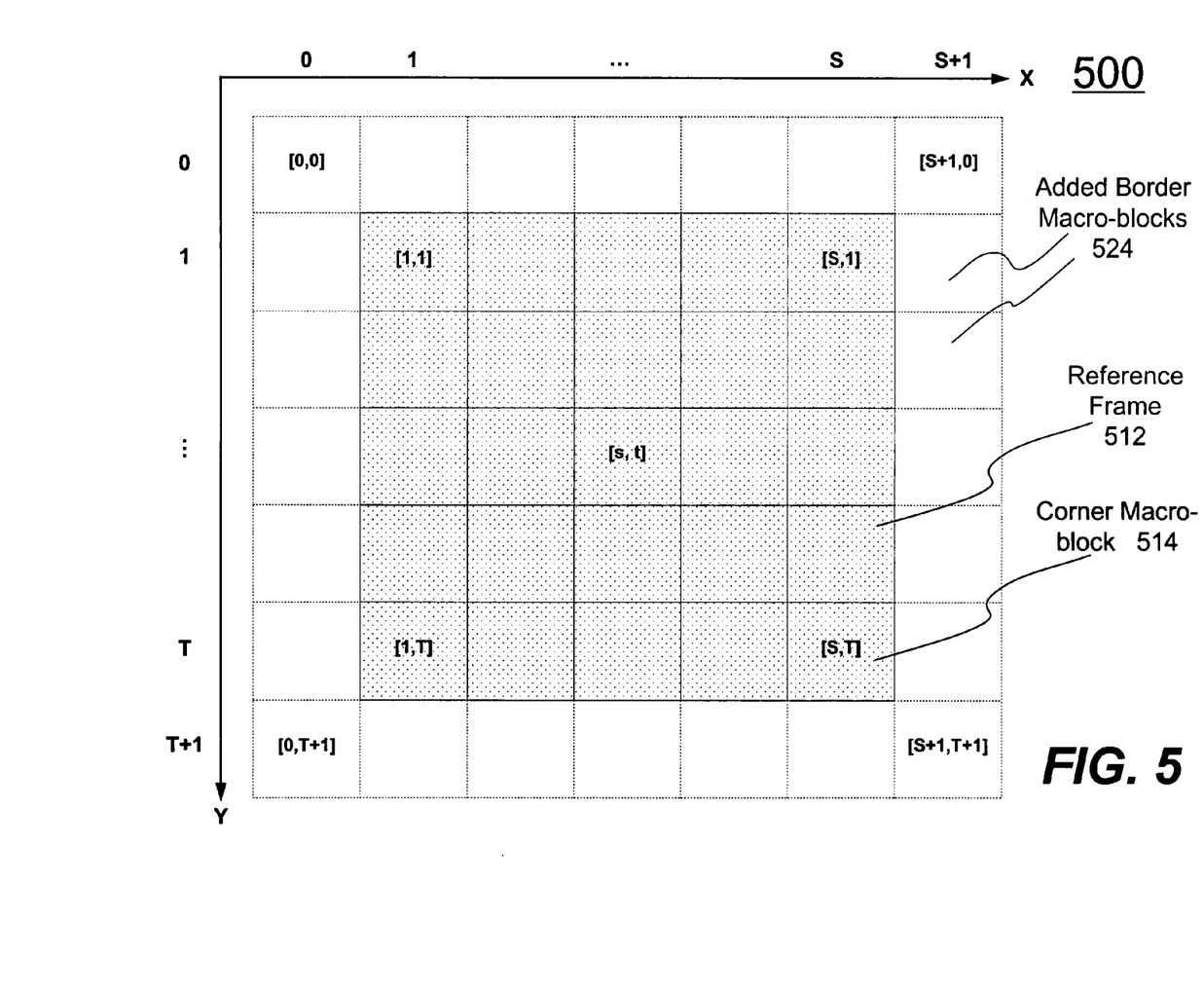
FIG. 5 shows an exemplary reference frame and its added border macro-blocks in accordance with one embodiment of the present invention.

In one embodiment, FIG. 5 shows an exemplary added border reference frame 500, which includes a shaded area 512 representing a reference frame (e.g., 312 of FIG. 3) and added border macro-blocks 524 surrounding the reference frame 512. The reference frame 512 is divided into T number of rows and S number of columns of total S×T macro-blocks. Depicted with dotted lines in FIG. 5, the added border macro-blocks 524 is created in an added border operation, which is carried out in accordance with rules (1)-(8) below. The coordinate system MB[s, t] used in the rules is depicted in FIG. 5. The first value of the coordinate is the column number s of the macro-block in the reference frame and the second is the row number t.

For the added border macro-blocks located at the corners, all of the pixel values are generated from the data of the corresponding corner macro-blocks 514 in the reference frame 512.

Left upper corner added border macro-block: MB[1,1]→MB[0,0] (1)

Right upper corner added border macro-block: MB[S,1]→MB[S+1,0] (2)

Left lower corner added border macro-block: MB[1,T]→MB[0,T+1] (3)

Right lower corner added border macro-block: MB[S,T]→MB[S+1,T+1] (4)

For other added border macro-blocks, all of the pixel values are generated from data of the adjacent or neighboring macro-blocks next to the border of the reference frame 512.

Top added border macro-blocks: MB[s,1]→MB[s,0] (5)

Bottom added border macro-blocks: MB[s,T]→MB[s,T+1] (6)

Left added border macro-blocks: MB[1,t]→MB[0,t] (7)

Right added border macro-blocks: MB[S,t]→MB[S+1,t] (8)

where $1<=s<=S$ and $1<=t<=T$ and the symbol "→" means "generate" not "duplicate".

When all of the macro-blocks of the search window 314 can be found in the reference frame 512, the processor 210 simply reads in the data of the center macro-block 102 and of the eight surrounding macro-blocks to construct the search window 314. No added border operation is required.

In one embodiment, for a 3×3 search window (e.g., 100 of FIG. 1), the added border has one layer of macro-blocks. In general, a m×m search window results into (m−1)/2 layers of macro-blocks as the added border. It is noted that m is a positive odd integer. In the following description, the macro-blocks and added border macro-blocks are expressed as the respective coordinate MB[s, t] as shown in FIG. 5. In one embodiment, the motion estimation operation starts with reading in the data of each of the macro-blocks in the current frame in the row-wise order. In other words, the motion estimation operation starts with macro-block MB[1,1] of the current frame, then the rest of the macro-blocks in the first row follows. After that, the macro-blocks of next rows get their turn to be processed.

After the search window 314 is constructed, the processor 210 sends the data of the current macro-block 304 and of the search window 314 to the motion estimator 220 via the system bus 250. This means that a total of ten macro-blocks (i.e., one current macro-block plus nine macro-blocks from the search window) of data are required to transmit on the system bus 250 for each motion estimation operation in the 3×3 exemplary search window of FIG. 1. The results of the motion estimation are transmitted back from the motion estimator 220 to the processor 210 again via the system bus 250. This operation is repeated for each of the current macro-blocks.

Figure 6:
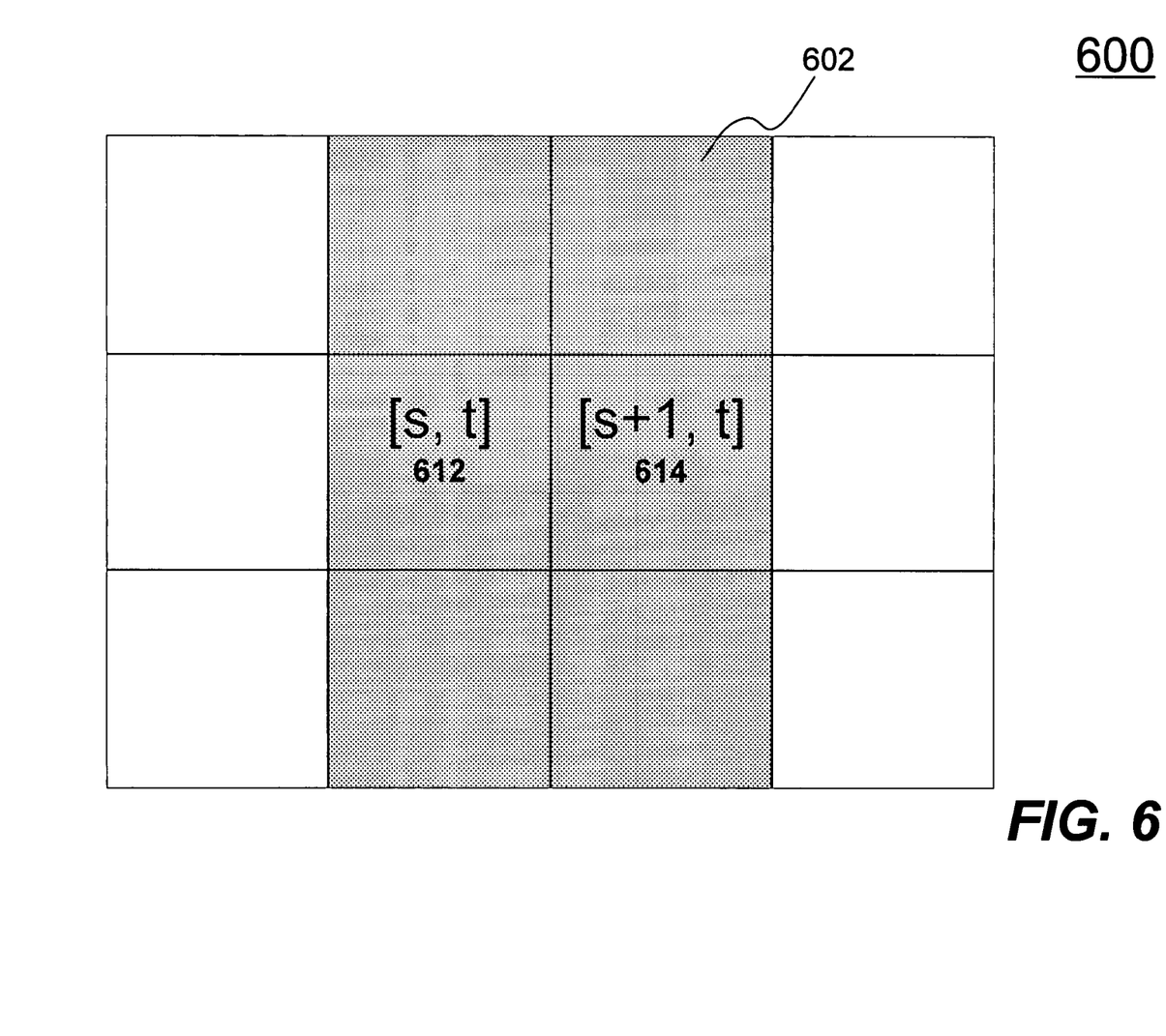
FIG. 6 shows the exemplary overlapped macro-blocks for a pair of neighboring macro-blocks in accordance with one embodiment of the present invention.

It is evident that there are a lot of data traffics generated by the motion estimation on the system bus 250. The above described motion estimation also creates a lot of redundant data transmission of the duplicated data due to the overlap of the search windows 314. As an example as shown in FIG. 6, the neighboring current macro-blocks MB[s, t] 612 and MB[s+1, t] 614 share six macro-blocks 602 (i.e., shaded area) in their respective search window. The similar situations exist for other neighbors. Today, the motion estimation for adjacent macro-blocks requires the repetitive transmission the data of these six identical macro-blocks 602, which causes unnecessary data transmission to bog down the system bus 250 thus lower motion estimation performance. This problem gets even worse, when a larger search window (e.g., 5×5) is used.

Figure 7:
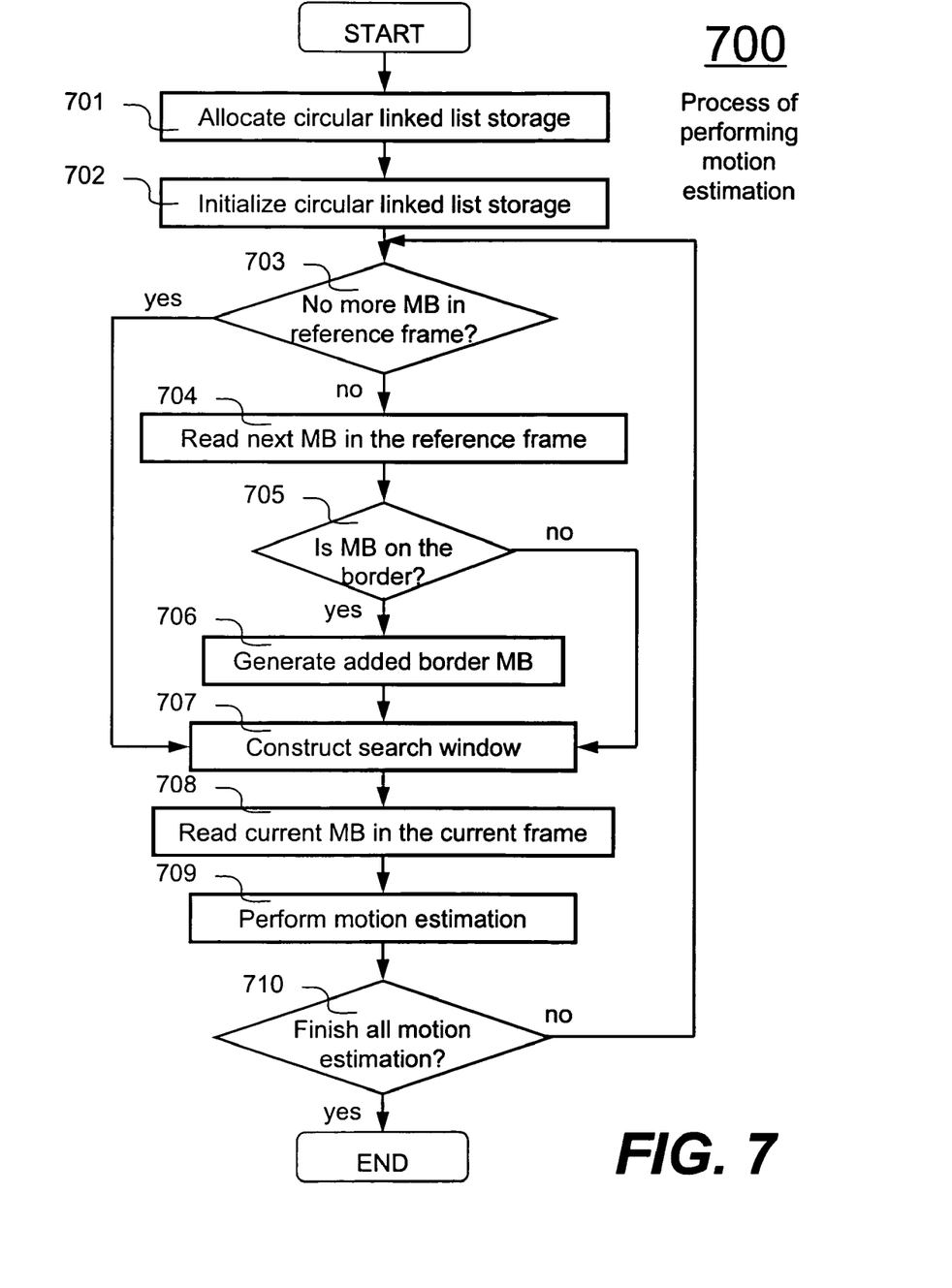
FIG. 7 shows a flowchart or process of performing motion estimation operation in accordance with one embodiment of the present invention.

FIG. 7 shows a process 700 or flowchart of performing motion estimation operation in accordance with one embodiment of the present invention. The process 700, which is preferably understood in conjunction with the previous figures especially FIGS. 1 to 5, may be implemented in software, hardware, or a combination of both. In this embodiment, the process 700 starts by allocating storage space for storing a search window in the motion estimator (e.g., 220 of FIG. 2). The allocated storage space is divided into a plurality of storage units with each unit having capacity of storing the data of one macro-block. The allocated storage space can store at least critical number of macro-blocks. The critical number is determined by the size (e.g., width or length) of the reference frame (e.g., 512 of FIG. 5) and the size of the search window (e.g., 100 of FIG. 1), and by the retrieval order (e.g., row-wise, column-wise, etc.) of the macro-blocks to be processed in the motion estimation. In this embodiment, the allocated storage space needs to store a plurality of consecutive macro-blocks of the reference frame 512 including macro-blocks 524 in the added border. And the plurality of the consecutive macro-blocks must contain at least one complete search window. For example, if the reference frame contains T rows and S columns of macro-blocks, the search window is m×m macro-blocks, and the data retrieval order of the current macro-blocks is row-wise, then the critical number is (S+m−1)(m−1)+m. For a 3×3 search window, the critical number is (S+2)2+3 or 2S+7. As shown in FIG. 5, a consecutive 2S+7 macro-blocks in a row-wise order contain two rows plus three macro-blocks of the added border reference frame 500. The critical number of consecutive macro-blocks always includes all of the nine macro-blocks in a 3×3 search window.

Figure 8:
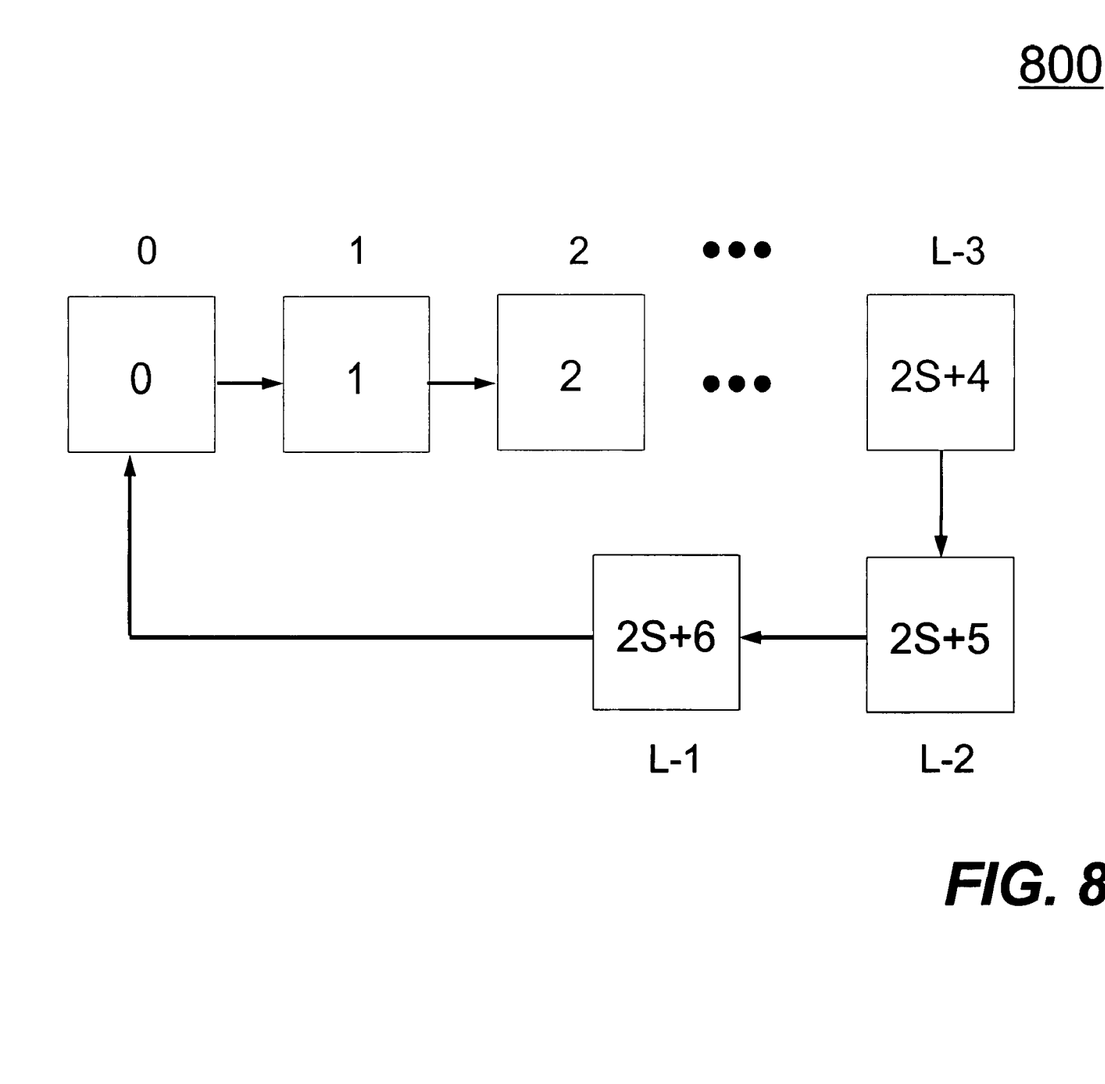
FIG. 8 shows an exemplary data structure (e.g., a ring buffer) for storing macro-blocks data to construct a search window in a motion estimator in accordance with one embodiment of the present invention.

FIG. 8 shows an exemplary data structure for storing macro-blocks data to construct a search window in a motion estimator in accordance with one embodiment of the present invention. In this embodiment, the data structure is a circular linked list 800 or a ring buffer 800 with total L elements (i.e., storage units). Each storage unit of the ring buffer stores the data of one macro-block. The storage units are numbered from 0 to L−1 corresponding to the position numbers of the storage units are from 0 to L−1 in the ring buffer 800. Using the exemplary reference frame (i.e., 512 of FIG. 5) and a 3×3 search window (i.e., 100 of FIG. 1). The length L is equal to 2S+7, and the elements are numbered from 0 to 2S+6. In one embodiment, the macro-blocks stored in the ring buffer 800 matches the macro-blocks in the added border reference frame (e.g., 500 of FIG. 5) in a row-wise sequence. Each of the storage units in the ring buffer corresponds to certain macro-blocks in the added border reference frame in a cyclical scheme. For example, MB[0,0] of the added border reference frame 500 corresponds to the zero-th storage unit of the ring buffer 800. MB[1,0] corresponds to the first unit.

MB[1,2] corresponds to the (L−1)-th unit. The next macro-block MB[1,3] will be stored in the zero-th unit again based upon the cyclical scheme.

For any given macro-block MB[s, t], its corresponding position in the ring buffer 800 can be determined with the following formula:

$$i = j \bmod L \qquad (9)$$

where: i is the position number in the ring buffer, L is the length of the ring buffer, and j is the j-th macro-block of the added border reference frame. For a row-wise order, the number j can be determined from the coordinate MB[s, t], the number of columns of the reference frame S and the size of the search window m. j=t×(S+m−1)+s. In the example of 3×3 search window and a S×T reference frame, L=2S+7, j=t×(S+2)+s.

One of the main advantages for storing the consecutive macro-blocks in the ring buffer 800 is that the access to these data can be achieved with Direct Memory Access (DMA). Using DMA to access data can reduce the data traffics on the system bus thereby improve the efficiency of video signal encoding operation.

Referring back to FIG. 7, the process 700 initializes the ring buffer 800 in the motion estimator at 702 after the ring buffer has been allocated. In one embodiment, the first 2S+6 (i.e., L−1) macro-blocks of an added border reference frame are stored into the ring buffer. This leaves one storage unit open in the ring buffer. The operation to store the last open storage unit is described below in the description for 704. To further explain the initialization process, an exemplary S×T reference frame 512 with a 3×3 search window 100 is used again. The initialization process reads all of the macro-blocks of the first row of the reference frame (i.e., MB[1,1]-MB[S, 1]) and the first macro-block of the second row (i.e., MB[1, 2]). These macro-blocks belong to the first (S+1)(m−1)/2 macro-blocks of the reference frame. The number m is the size of the search window. These macro-blocks are part of the first 2S+6 macro-blocks of the added border reference frame 500 that belong to the reference frame 512. Based upon formula (9), these macro-blocks are stored into the S+3 to 2S+2 (i.e., from the first row of the reference frame) and 2S+5 (i.e. from the second row) positions of the ring buffer 800. When reading and storing these macro-blocks, a border test is conducted to determine whether the macro-block is next to the border. If so, one or more added border macro-blocks will be generated. In this embodiment, the added border macro-blocks 524 MB[0,0] to MB[S+1,0], MB[0,1], MB[S+1,1], and MB[0,2] are generated and stored into positions 0 to S+2, 2S+3, and 2S+4 of the ring buffer, respectively. The added border macro-blocks can be generated right after each macro-block is read in or after all of the macro-blocks have been read in. After initialization is completed, the ring buffer will contain macro-blocks MB[0,0] to MB[1,2] as its positions 0 to 2S+5. The only un-initialized storage unit is position 2S+6.

The process 700 moves to a test 703 after the completing of the initialization. The test 703 determines whether all of the macro-blocks in the reference frame have been read in. For example, MB[S, T] is the last macro-block of the reference frame 500. The test 703 would be true if the current block is MB[S, T]. When the test 703 is true, the process 700 follows the "yes" branch to continue the rest of the process at 707 and beyond. Otherwise, the process 700 reads in the next macro-block from the reference frame and stores into a corresponding position based on formula (9) in the ring buffer 800. In the embodiment of added border reference frame 500 of FIG. 5, macro-block MB[2, 2] is the one to be read in after the initialization is completed. And MB[2,2] is stored into position 2S+6 of the ring buffer 800. The next macro-block to be read in is MB[3,2] and to be stored into position 0 of the ring buffer overwriting the existing content. For the last macro-block of the reference frame MB[S,T], the corresponding position in the ring buffer is [(T(S+2)+S) mod (2S+7)].

After each macro-block is read in at 704, the process 700 performs a test 705. Test 705 determines whether the macro-block just read in is next to the border of the reference frame. If test 705 is true, the process 700 generates the added border macro-blocks based on formula (1)-(8) and stores into the proper position in the ring buffer using formula (9) at 706. The test 705 is true when the coordinate of the macro-blocks MB[s, t] meet one of the following conditions: s is equal to 1 or S, or t is equal to 1 or T. For example, macro-block MB[1,1] or MB[S, T] is a corner macro-block thereby the test 705 is true. Three added border macro-blocks are generated from MB[S,T] as follows:

$$MB[S,T] \rightarrow MB[S+1,T]$$

$$MB[S,T] \rightarrow MB[S,T+1]$$

$$MB[S,T] \rightarrow MB[S+1,T+1]$$

It is noted that "→" means "generate" not "duplicate". Three added border macro-blocks are stored into the following respective positions of the ring buffer 800.

$$(T \times (S+2) + (S+1)) \bmod (2S+7);$$

$$((T+1) \times (S+2) + (S)) \bmod (2S+7);$$

$$((T+1) \times (S+2) + (S+1)) \bmod (2S+7)$$

Otherwise, if the test 705 is false, the process 700 follows the "no" branch skipping 706. For example, macro-block MB[2, 2] is not on the border thereby the test 705 is not true. No added border operation is required after reading in MB[2, 2]. After the process 700 completes 706, all of the necessary macro-block data have been stored in the ring buffer to represent a search window for the motion estimation.

Based upon the above described logic, the process 700 only needs to read in one additional macro-block to fill up the ring buffer 800 to form a m×m search window via the system bus (e.g., 250 of FIG. 2) for each current macro-block at coordinate [s, t] after the initialization at 702. If the current macro-block MB[s, t] is located on the right border, the next macro-block to be read in from the reference frame is the first macro-block in the next row MB[1, t+1]. If the current macro-block at the coordinate [s, t] is not located on the border, the next macro-block to be read in from the reference frame is MB[s+1, t+1]. If the macro-block read in from the reference frame is located next to the border, then an added border operation is required. When the current macro-block is at the coordinate [S, T−1], all of the required macro-blocks have been read in and stored into the proper positions of the ring buffer. In other words, the last current macro-block is located at coordinate [S, T−1].

Then the process 700 moves to 707, in which the search window is constructed using the data stored in the ring buffer. When the current macro-block is at the coordinate [s, t] of the current frame. The 3×3 search window can be constructed with the following nine macro-blocks of the reference frame: MB[s−1, t−1], MB[s, t−1], MB[s+1, t−1], MB[s−1, t], MB[s, t], MB[s+1, t], MB[s−1, t+1], MB[s, t+1], and MB[s+1, t+1]. Using formula (9), these nine macro-blocks can be easily identified and retrieved from the ring buffer 800. After the search window is constructed at 707, the process 700 reads in the current macro-block from the current frame at 708. The motion estimation can be carried out with the search window and the current macro-block at 709. The traditional motion estimation results (i.e., motion vector, residual, etc.) are obtained and transmitted from the motion estimator (i.e., 220 of FIG. 2) to the processor 210 via the system bus 250. After the results of the motion estimation of the current macro-block, the process 700 checks if there are other macro-blocks in the current frame still needing motion estimation at the test 710. If the test 710 is false, the process 700 goes back to 703 to read in and perform motion estimation of another current macro-block until the test 710 is true. And the process 710 ends.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for performing motion estimation in video signal processing, the method comprising:

allocating a plurality of storage units as a ring buffer to store at least a critical number L of data blocks of a reference frame, wherein the reference frame has a dimension of a width S and a length T, and each of the data block is stored into one of the storage units;

establishing a rule relating each of the data blocks to each position of the storage units based on a search window of a size m;

initializing the ring buffer by reading in one less the critical number of data blocks from the reference frame;

reading in a next data block from the reference frame and storing into a corresponding position of the storage units of the ring buffer in accordance with the rule;

generating one or more layers of added border data blocks when the next data block is located next to a border of the reference frame; and performing the motion estimation using a current data block together with the search window constructed from certain ones of the data blocks stored in the ring buffer, wherein the critical number is determined using the size m of the search window, the width S and the length T of the reference frame and a data block accessing sequence of the reference frame.

2. The method of claim 1, wherein the plurality of storage units are allocated with a sequence of consecutive addresses.

3. The method of claim 2, wherein an access to any of the plurality of storage units is through a Direct Memory Access (DMA).

4. The method of claim 1, wherein the ring buffer is located in a storage space of a motion estimator.

5. The method of claim 4, wherein the motion estimator is an application specific integrated circuit.

6. The method of claim 1, wherein the size m of the search window, the width S and the length T of the reference frame are measured in data blocks.

7. The method of claim 6, wherein the size m of the search window is a positive odd integer.

8. The method of claim 6, wherein the width S is a number of columns and the length T is a number of rows of data blocks in the reference frame.

9. The method of claim 1, wherein the data block accessing sequence is one of row-wise and column-wise.

10. The method of claim 1, wherein the critical number is equal to $[(S+m-1)\times(m-1)+m]$, when the data block accessing sequence is row-wise.

11. The method of claim 1, wherein the added border has $[m-1]$ layers of data blocks.

12. The method of claim 11, wherein an added border reference frame comprises of the reference frame and the added border.

13. The method of claim 11, wherein the each of the data blocks has a column coordinate s and row coordinate t in the reference frame.

14. The method of claim 13, wherein the rule between the position of the storage units of the ring buffer is defined as $[(t\times(S+m-1)+s) \bmod L]$ for the each of the data blocks of the reference frame.

15. The method of claim 11, wherein said generating one or more layers of added border data blocks further includes:

determining the each of the data blocks in the reference frame is located next to the border;

generating $[(m-2)\times(m-2)]$ corner added border data blocks, if coordinates $[s, t]$ of the each of the data blocks is equal to one of $[1,1]$, $[S,1]$, $[1,T]$ and $[S,T]$; and generating $[m-2]$ neighboring added border data blocks, if s equals to 1 or S, or t equals to 1 or T.

16. The method of claim 11, wherein the size of the search window is at least 3.

17. The method of claim 16, wherein the search window is constructed by the certain ones of the data blocks correspond to following coordinates in the added border reference frame: $[s-1,t-1]$, $[s,t-1]$, $[s+1,t]$, $[s-1,t]$, $[s,t]$, $[s+1,t]$, $[s-1,t+1]$, $[s,t+1]$ and $[s+1,t+1]$.

18. The method of claim 1, wherein the data block is a macro-block of 16×16 pixels.

* * * * *